(12) United States Patent  (10) Patent No.: US 7,046,450 B2
Hirata  (45) Date of Patent: May 16, 2006

(54) LIQUID-IMMERSION OBJECTIVE OPTICAL SYSTEM

(75) Inventor: Tadashi Hirata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/169,729

(22) Filed: Jun. 30, 2005

(65) Prior Publication Data

US 2006/0007558 A1    Jan. 12, 2006

(30) Foreign Application Priority Data

Jul. 6, 2004    (JP) ............................. 2004-199632

(51) Int. Cl.
    *G02B 21/02*    (2006.01)
(52) U.S. Cl. ..................... 359/657; 359/656; 359/755; 359/793; 359/794; 359/795; 359/368
(58) Field of Classification Search ........ 359/656–661, 359/755, 793, 794, 795, 368
    See application file for complete search history.

(56) References Cited

U.S. PATENT DOCUMENTS

| | | | | |
|---|---|---|---|---|
| 5,530,590 A | * | 6/1996 | Saito ........................ | 359/658 |
| 5,532,878 A | * | 7/1996 | Suenaga et al. ............ | 359/657 |
| 5,798,869 A | * | 8/1998 | Watanabe ................... | 359/658 |
| 5,805,346 A | * | 9/1998 | Tomimatsu ................. | 359/656 |
| 5,978,147 A | * | 11/1999 | Kudo ......................... | 359/656 |
| 6,501,603 B1 | * | 12/2002 | Kasahara .................... | 359/656 |
| 6,519,092 B1 | * | 2/2003 | Yamaguchi ................. | 359/656 |
| 6,633,365 B1 | * | 10/2003 | Suenaga ..................... | 355/53 |
| 6,844,919 B1 | * | 1/2005 | Suenaga ..................... | 355/55 |
| 2003/0043473 A1 | * | 3/2003 | Okuyama .................... | 359/659 |
| 2004/0051957 A1 | | 3/2004 | Liang | |
| 2005/0190435 A1 | * | 9/2005 | Shafer et al. ............... | 359/365 |
| 2005/0190455 A1 | * | 9/2005 | Rostalski et al. ........... | 359/649 |

* cited by examiner

*Primary Examiner*—Evelyn A. Lester
(74) *Attorney, Agent, or Firm*—Kenyon & Kenyon LLP

(57) ABSTRACT

The invention provides a liquid-immersion objective optical system including a first lens group and a second lens group. The first lens group includes a first lens component having positive refractive power, an object side thereof being a flat surface and a convex surface thereof facing an image-plane side; a second lens component having positive refractive power, a convex surface thereof facing the image-plane side; a third lens component having positive refractive power as a whole, formed by cementing a biconvex positive lens and a negative lens; and a fourth lens component formed by cementing a negative lens and a biconvex positive lens. The second lens group includes a fifth lens component formed by cementing a lens having a concave surface facing the object side and a lens having a convex surface facing the image-plane side; a sixth lens component having positive refractive power; and a seventh lens component having negative refractive power. The focal length F1 of the entire first lens group, the magnification M of the objective optical system, the distance LT between the object plane and the image plane, and the distance LG between the object side of the first lens component L1 and the image side of the fourth lens component L4 satisfy the following conditional expressions:

$0.2 < |M \cdot F1/LT| < 0.45$ $0/2 < |LG1/LT| < 0.4$.

6 Claims, 8 Drawing Sheets

SPHERICAL ABERRATION
NA 0.119

---·--- 435.64
—·—·— 486.13
·········· 656.27
-------- 652.11
———— 587.56

ASTIGMATISM
y=0.66

-------- 652.11
———— 587.56

DISTORTION
y=0.66

———— 587.56

CHROMATIC DIFFERENCE OF MAGNIFICATION
y=0.66

---·--- 435.64
—·—·— 486.13
·········· 656.27
-------- 652.11

COMATIC ABERRATION (MERIDIONAL)

COMATIC ABERRATION (SAGGITAL)

LIQUID-IMMERSION OBJECTIVE OPTICAL SYSTEM

BACKGROUND OF THE INVENTION

1. Field of the Invention

The present invention relates to an objective optical system with a high numerical aperture and a long, thin shape, and more particularly, to a liquid-immersion objective optical system that is suitable for insertion into an animal, such as a mammal, for in-vivo examination.

This application is based on Japanese Application No.2004-199632, the content of which is incorporated herein by reference.

2. Description of Related Art

Conventional methods include those in which a dye or fluorescent marker is attached to particular molecules, tissue, or cells, which are then examined using a fluorescence microscope, a confocal laser-scanning microscope, or the like, to observe the behavior of the molecules inside the cells or tissue of a living organism. Since the behavior of molecules in the body of a live mammal, such as a mouse, may differ from that in cultured cells, it is usual to carry out in-vivo examination of biological tissue and cells in a living organism.

Since conventional microscopes have a large objective lens diameter, when examining the interior of a body of a living organism, it is necessary to make a large incision in the living organism for examination. However, since making a large incision in the organism results in a high degree of invasiveness, an excessively large strain is placed on the organism, and therefore, it is not possible to carry out examination for a long period of time.

Endoscopes generally have a small diameter, resulting in a low level of invasiveness to the organism; however, since their magnification is low, the behavior of molecules in the tissue and cells of the organism cannot be sufficiently examined.

Furthermore, magnifying endoscopes have a higher magnification but the numerical aperture (NA) at the object side is low. Therefore, the resolution and brightness are insufficient.

In the specification of US Patent Application No. 2004/0051957, an objective optical system having a high numerical aperture, a narrow diameter, and a comparatively long overall length is disclosed. With this objective optical system, it is possible to examine a living organism with a low degree of invasiveness by making a small hole in the organism and inserting the objective optical system through this hole.

However, the objective optical system disclosed in the above-cited reference has a drawback in that chromatic aberrations are not sufficiently corrected. Therefore, when performing white-light observation and fluoroscopy, since the wavelength of fluorescence produced in the specimen is different from the wavelength of the excitation light, the resolution is reduced. When performing fluoroscopy, particularly when using a confocal optical system, if the chromatic aberrations are not corrected, there is a problem in that the brightness of the fluorescence to be detected is low.

BRIEF SUMMARY OF THE INVENTION

The present invention has been conceived in light of the circumstances described above, and an object thereof is to realize an objective optical system that has a narrow diameter and long overall length, that is well-corrected for chromatic aberrations, and that has a high numerical aperture, thus being suitable for in-vivo examination.

In order to realize the above-described object, the present invention provides the following solutions.

According to a first aspect, the present invention provides a liquid-immersion objective optical system including a first lens group; and a second lens group. The first lens group includes a first lens component having positive refractive power, wherein an object side thereof is a flat surface and a convex surface thereof faces an image-plane side; a second lens component having positive refractive power, wherein a convex surface thereof faces the image-plane side; a third lens component having positive refractive power as a whole, formed by cementing a biconvex positive lens and a negative lens; and a fourth lens component formed by cementing a negative lens and a biconvex positive lens. The second lens group includes a fifth lens component formed by cementing a lens having a concave surface facing at least the object side and a lens having a convex surface facing the image-plane side; a sixth lens component having positive refractive power; and a seventh lens component having negative refractive power. The liquid-immersion objective optical system satisfies conditional expressions (1) and (2) below:

$$0.2 < |M \cdot F1/LT| < 0.45 \qquad (1)$$

$$0.2 < |LG1/LT| < 0.4 \qquad (2)$$

Here, F1 is the overall focal length of the first lens group, M is the magnification of the liquid-immersion objective optical system, LT is the distance from an object plane to the image plane, and LG1 is the distance from the object side of the first lens component to the image side of the fourth lens component.

In order to examine a site deep inside the body of a small laboratory animal, such as a mouse, with minimal invasiveness, it is preferable that the diameter of the lens group in a part of the liquid-immersion objective optical system close to the object be 3 mm or less. More concretely, the part of the liquid-immersion objective optical system close to the object means a region within 8 mm from the tip of the liquid-immersion objective optical system. To observe an image viewed with the liquid-immersion objective optical system, it is necessary to connect a relay lens and CCD behind the objective lens to view the image at a position slightly separated from the organism. In order to make it difficult for the relay lens and CCD to touch the animal (for example, the head thereof), it is preferable that the overall length of the optical system, from the object plane of the liquid-immersion objective optical system to the image plane, be at least 20 mm. Also, in order to obtain bright fluorescence images and high resolution, it is preferable that the numerical aperture at the object side of the liquid-immersion objective optical system be 0.6 or higher.

According to the present invention, these conditions can be satisfied.

Since the object side of the first lens component is a flat surface, it is possible to prevent the existence of an air gap between the first lens component and the living organism.

The first lens component and the second lens component have positive refractive powers, the image side of the first lens component is a convex surface, and the image side of the second lens component is also a convex surface. Therefore, the lens power can be distributed between the first lens component and the second lens component. In addition, by making the image-plane sides of both lenses convex, a condition close to the aplanatic condition can be achieved, and it is thus possible to reduce the occurrence of spherical aberration and comatic aberration.

Furthermore, using the cemented interface of the third lens component, it is possible to correct on-axis chromatic aberration produced in the first and second lens components. Likewise, using the cemented interface of the fourth lens component, it is possible to correct spherical aberration, comatic aberration, and chromatic difference of magnification produced in the first to third lens components, and in addition, it is possible to correct any on-axis chromatic aberration that was not sufficiently corrected by the third lens component. The concave surface at the object side of the fifth lens component reduces the Petzval sum, thus reducing field distortion, and enables spherical aberration, comatic aberration, on-axis aberration, and chromatic difference of magnification produced at other surfaces of the second lens group to be corrected. Also, it is possible to focus the light with the positive refractive power of the image-side convex surface of the fifth lens component and with the sixth lens component.

If $|M \cdot F1/LT| \leq 0.2$, the angle of the off-axis principal ray emitted from the first lens group becomes too large, which makes it difficult to correct the comatic aberration. If $0.45 \leq |M \cdot F1/LT|$, the overall refractive power of the first lens group becomes weak, and accordingly, the beam diameter increases and the lens diameter increases. Such a problem does not arise if conditional expression (1) is satisfied.

If $|LG1/LT| \leq 0.2$, the length of the first lens group 1 is reduced, which makes it difficult to insert the objective optical system to a site deep inside the living organism, thus making it difficult to examine deep sites in the living organism. On the other hand, if $0.4 \leq |LG1/LT|$, the lens diameter increases because the off-axis rays are too high, which increases the degree of invasiveness caused to the living organism. Therefore, satisfying conditional expression (2) avoids such a problem and ensures a sufficient length of the first lens group.

Hence, with such a configuration, it is possible to realize a liquid-immersion objective optical system that has a narrow diameter and long overall length, that is well-corrected for chromatic aberrations, and that has a high numerical aperture, thus being suitable for in-vivo examination.

In the aspect of the invention described above, the following conditional expressions (3), (4) and (5) are preferably satisfied:

$$v42 - v41 > 40 \tag{3}$$

$$n41 - n42 > 0.3 \tag{4}$$

$$0.7 < |R4/F1| < 1.2 \tag{5}$$

Here, R4 is the radius of curvature of a cemented surface in the fourth lens component, v41 and v42 are the d-line Abbe numbers of the negative lens and the biconvex positive lens in the fourth lens component, respectively, and n41 and n42 are the d-line refractive indices of the negative lens and the biconvex positive lens in the fourth lens component, respectively.

If $v42 - v41 \leq 40$, there is a problem in that the on-axis chromatic aberration and the chromatic difference of magnification are under-corrected. Therefore, satisfying conditional expression (3) enables the on-axis chromatic aberration and the chromatic difference of magnification to be properly corrected.

If $n41 - n42 \leq 0.3$, the spherical aberration and comatic aberration are under-corrected. Therefore, satisfying conditional expression (4) enables the spherical aberration and comatic aberration to be properly corrected.

If $|R4/F1| \leq 0.7$, the radius of curvature becomes too small, which makes the lenses more difficult to fabricate, and if $1.2 \leq |R4/F1|$, the aberrations are under-corrected. Therefore, satisfying conditional expression (5) allows the spherical aberration, the comatic aberration, the on-axis chromatic aberration, and the chromatic difference of magnification to be properly corrected.

In the aspect of the invention described above, the following conditional expressions (6) and (7) are preferably satisfied:

$$v31 - v32 \geq 40 \tag{6}$$

$$0.7 < |R3/F1| < 1.7 \tag{7}$$

Here, R3 is the radius of curvature of the cemented surface of the third lens component, and v31 and v32 are the d-line Abbe numbers of the biconvex positive lens and the negative lens, respectively, in the third lens component.

If $v31 - v32 < 40$, the on-axis chromatic aberration is under-corrected. Therefore, satisfying conditional expression (6) allows the on-axis chromatic aberration to be properly corrected.

If $|R4/F1| \leq 0.7$, the radius of curvature becomes too small, which makes the lenses more difficult to fabricate. On the other hand, if $1.7 \leq |R3/F1|$, the on-axis chromatic aberration is under-corrected. Therefore, satisfying conditional expression (7) allows the on-axis chromatic aberration to be properly corrected.

In the aspect of the invention described above, the following conditional expression (8) is satisfied:

$$0.5 < |R5O/R5I| < 0.8 \tag{8}$$

Here, R5O is the radius of curvature of the concave surface at the object side of the fifth lens component, and R5I is the radius of curvature of the convex surface at the image-plane side of the fifth lens component.

If $|R5O/R5I| < 0.5$, the aberrations are over-corrected. On the other hand, if $0.8 < |R5O/R5I|$, the aberrations are under-corrected. Therefore, satisfying conditional expression (8) allows the spherical aberration, comatic aberration, on-axis chromatic aberration, and chromatic difference of magnification to be properly corrected.

In the aspect of the invention described above, the first lens component is preferably formed by cementing a parallel flat plat and a plano-convex lens.

Since the surface at the extreme object side is placed directly in contact with the living organism or with water, by using a parallel flat plate, it is possible to construct this surface of glass, which has high tolerance properties.

In the aspect of the invention described above, the sixth lens component preferably includes two lenses having positive refractive power. With this configuration, by splitting the positive refractive power between two lenses, it is possible to the amount of spherical aberration and comatic aberration produced.

The working distance (the distance between the object plane and the image side of the objective optical system) is preferably 300 μm or less.

Since a live animal moves due to a pulse or breathing, there may be cases where the image becomes blurred if the area to be examined moves away from the objective optical system, thus making it difficult to observe. Therefore, by making the working distance of the objective optical system 300 μm or less and placing the objective optical system in contact with the area to be examined, it is possible to prevent relative motion with respect to the objective optical system, which prevents image blurring.

The present invention affords an advantage in that it is possible to realize an objective optical system that has a narrow diameter and long overall length, that is well-corrected for chromatic aberrations, and that has a high numerical aperture, thus being suitable for in-vivo examination.

DETAILED DESCRIPTION OF THE INVENTION

Figure 1:
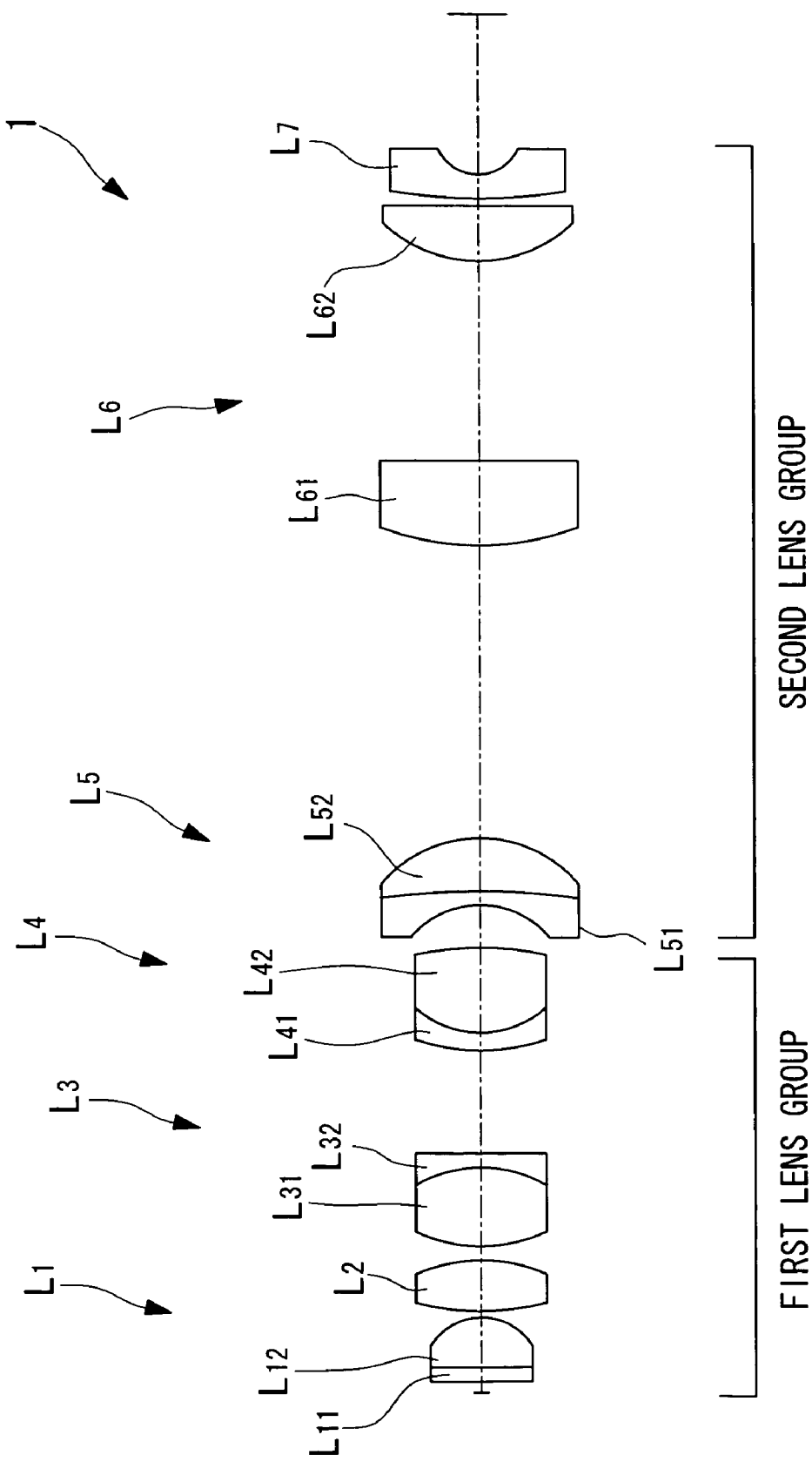
FIG. 1 is a lens diagram showing a liquid-immersion objective optical system according to an embodiment of the present invention.

A liquid-immersion objective optical system according to a first embodiment of the present invention is described below with reference to FIGS. 1 to 8. In the description of this embodiment, the pupil position at the object side is at infinity ($\infty$). Also, reference character r represents the radius of curvature, reference character d represents the distance between surfaces, reference character n represents the refractive index at the d-line (587.56 nm), and reference character v represents the Abbe number.

As shown in FIG. 1, a liquid-immersion objective optical system 1 according to this embodiment is formed of a first lens group and a second lens group, in this order from the object side. The first lens group includes a first lens component L1 having positive refractive power and formed of a parallel flat plate L11 and a plano-convex lens L12 whose convex surface faces the image plane; a second lens component L2 having positive refractive power and a convex surface facing the image plane; a third lens component having overall positive refractive power, formed by cementing a biconvex lens L31 and a negative lens L32; and a fourth lens component L4 formed by cementing a negative lens L41 and a biconvex lens L42. The second lens group includes a fifth lens component L5 formed by cementing at least a lens L51 having a concave surface facing the object side and a lens L52 having a convex surface facing the image side; a sixth lens component L6 formed of lenses L61 and L62 having positive refractive power; and a seventh lens component L7 having negative refractive power.

The liquid-immersion objective optical system 1 according to this embodiment satisfies the conditional expressions (1) to (8) shown below.

$$0.2 < |M \cdot F1/LT| < 0.45 \tag{1}$$

$$0.2 < |LG1/LT| < 0.4 \tag{2}$$

$$v42 - v41 > 40 \tag{3}$$

$$n41 - n42 > 0.3 \tag{4}$$

$$0.7 < |R4/F1| < 1.2 \tag{5}$$

$$v31 - v32 \geq 40 \tag{6}$$

$$0.7 < |R3/F1| < 1.7 \tag{7}$$

$$0.5 < |R5O/R5I| \leq 0.8 \tag{8}$$

Here, F1 is the overall focal length of the first lens group; M is the magnification of the objective optical system; LT is the distance from the object plane to the image plane; LG1 is the distance from the object side of the first lens component L1 to the image side of the fourth lens component L4; R4 is the radius of curvature of the cemented surface in the fourth lens component L4; v41 and v42 are the d-line Abbe numbers of the negative lens and the biconvex positive lens in the fourth lens component L4, respectively; n41 and n42 are the d-line refractive indices of the negative lens and the biconvex positive lens in the fourth lens component L4, respectively; R3 is the radius of curvature of the cemented surface in the third lens component L3; v31 and v32 are the d-line Abbe numbers of the biconvex positive lens and the negative lens in the third lens component L3; R5O is the radius of curvature of the concave surface at the object side of the fifth lens component L5; and R5I is the radius of curvature of the convex surface at the image side of the fifth lens component L5.

With the liquid-immersion objective optical system 1 according to this embodiment, since the object side of the first lens component L1 is a flat surface, it is possible to ensure that no air gap exists between the first lens component L1 and the living organism.

Also, since the first lens component L1 and the second lens component L2 have positive refractive powers, the image side of the first lens component L1 is convex, and the image side of the second lens component L2 is also convex, the lens power can be distributed between the first lens component L1 and the second lens component L2, and in addition, it is possible to reduce the incidence of spherical aberration and comatic aberration close to the aplanatic condition by making the image-plane sides of both lens components L1 and L2 convex.

Furthermore, it is possible to carry out correction of on-axis chromatic aberration occurring in the first and second lens components L1 and L2 with the cemented surface of the third lens component L3. Using the cemented surface of the fourth lens component L4, it is possible to correct spherical aberration, comatic aberration, and chromatic difference of magnification occurring in the first to third lens components L1 to L3, and in addition, it is also possible to correct any on-axis chromatic aberration that could not be completely corrected with the third lens component L3. The concave surface at the object side of the fifth lens component L5 allows the Petzval sum to be reduced, thus reducing the field curvature, and in addition, it is possible to correct spherical aberration, comatic aberration, on-axis chromatic aberration, and chromatic difference of magnification occurring at the other surfaces of the second lens group. It is also possible to focus the beam with the positive refractive powers of the convex surface at the image side of the fifth lens component L5 and of the sixth lens component L6. Furthermore, the Petzval sum can be reduced using the negative refractive power of the seventh lens component L7, which allows the field curvature to be reduced.

Therefore, the liquid-immersion objective optical system 1 according to this embodiment offers an advantage in that it is possible to realize an objective optical system that has a small outer diameter and long overall length, that is well-corrected for chromatic aberrations, and which has a high numerical aperture, thus making it suitable for in-vivo examination.

Figure 2:
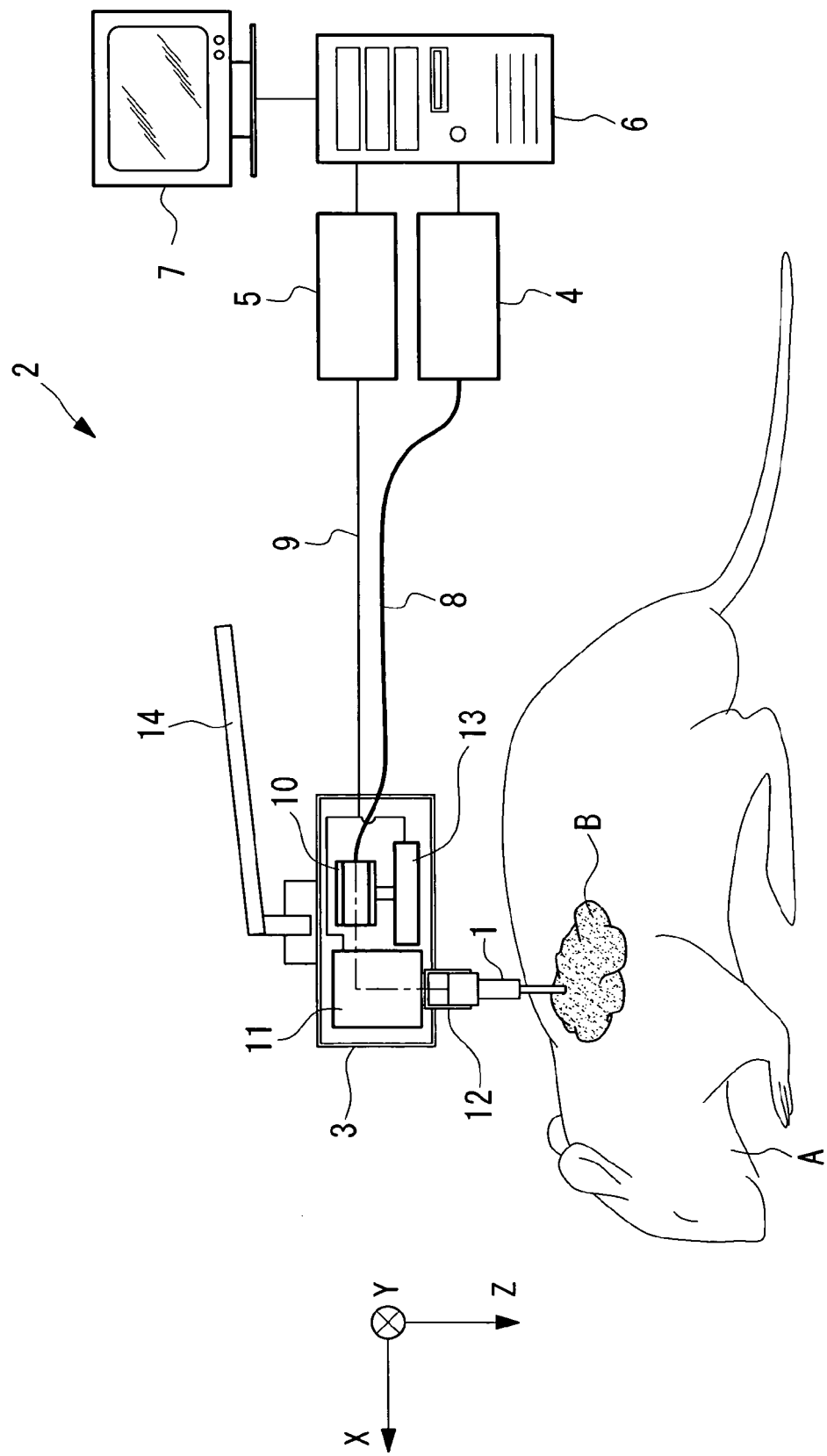
FIG. 2 is an overall block diagram showing an example in which the liquid-immersion objective lens of FIG. 1 is connected to an attached compact laser-scanning confocal optical system.

FIG. 2 shows an example in which the liquid-immersion objective optical system according to this embodiment is connected to a compact laser-scanning confocal optical system 2.

This laser-scanning confocal optical system 2 includes a scanning unit 3 to which the liquid-immersion objective optical system 1 is attached, an optical unit 4 and a control unit 5 that are connected to the scanning unit 3, a computer (PC) 6 that is connected to the optical unit 4 and the control unit 5, and a monitor 7 that is connected to the computer 6.

An excitation light source, a dichroic mirror, an excitation-light cutting filter, and an optical detector (none of which are shown) are provided in the optical unit 4. The optical unit 4 is connected to the scanning unit 3 via an optical fiber 8. Also, the control unit 5 is connected to the scanning unit 3 via an electrical signal line 9.

Inside the scanning unit 3, there are provided a collimator optical system for converting the propagating laser light to collimated light, an optical scanner 11 for two dimensionally scanning the collimated light from the collimator optical system 10 under the control of the control unit 5, and a pupil-projection optical system for forming an intermediate image. The laser light emitted by the laser light source is guided to the scanning unit 3 via the optical fiber 8, and after being converted to collimated light by the collimator optical system 10, the emergence direction of the light is scanned by the optical scanner 11, and an intermediate image is formed by the pupil-projection optical system 12.

In the figure, reference numeral 13 is an actuator that moves the collimator optical system 10 in the optical axis direction under the control of the control unit 5 to adjust the focal position, and reference numeral 14 is an arm that supports the scanning unit 3 in such a manner that it can be placed at any angle and position.

The liquid-immersion objective optical system 1 is connected to the pupil-projection optical system 12, and the image formed by the pupil-projection optical system 12 is re-imaged at the specimen (living organism) A by the liquid-immersion objective optical system 1 shown in FIG. 1 to excite an examination site (biological tissue, dye, etc.) B.

Fluorescence produced at the examination site B in the specimen (living organism) A passes through the liquid-immersion objective optical system 1, the pupil-projection optical system 12, the optical scanner 11, the collimator optical system 10, and the optical fiber 8, and is split off from the excitation light by the dichroic mirror (not shown) in the optical unit 4. Thereafter, the fluorescence passes through the excitation-light cutting filter and is detected by the optical detector. The computer 6 carries out predetermined image processing on the fluorescence detected by the optical detector and displays a fluorescence image on the monitor 7.

In this embodiment, the core of the optical fiber 8 acts as a confocal pinhole to cut light from regions except for the vicinity of the region in focus when examining the specimen A. Therefore, it is possible to display an image having a high signal-to-noise (S/N) ratio on the monitor 7.

Moreover, by operating the actuator 13 to change the distance between the collimator optical system 10 and the optical fiber 8 inside the scanning unit 3, it is possible to scan the examination point in the longitudinal direction (Z direction) of the liquid-immersion objective optical system 1. It is also possible to acquire a three-dimensional image by combining this scanning with scanning in the lateral directions (X and Y directions) using the optical scanner 11.

EXAMPLES

Example 1

A first example of the liquid-immersion objective optical system 1 according to the embodiment described above will now be described with reference to FIGS. 3 to 5B.

Figure 3:
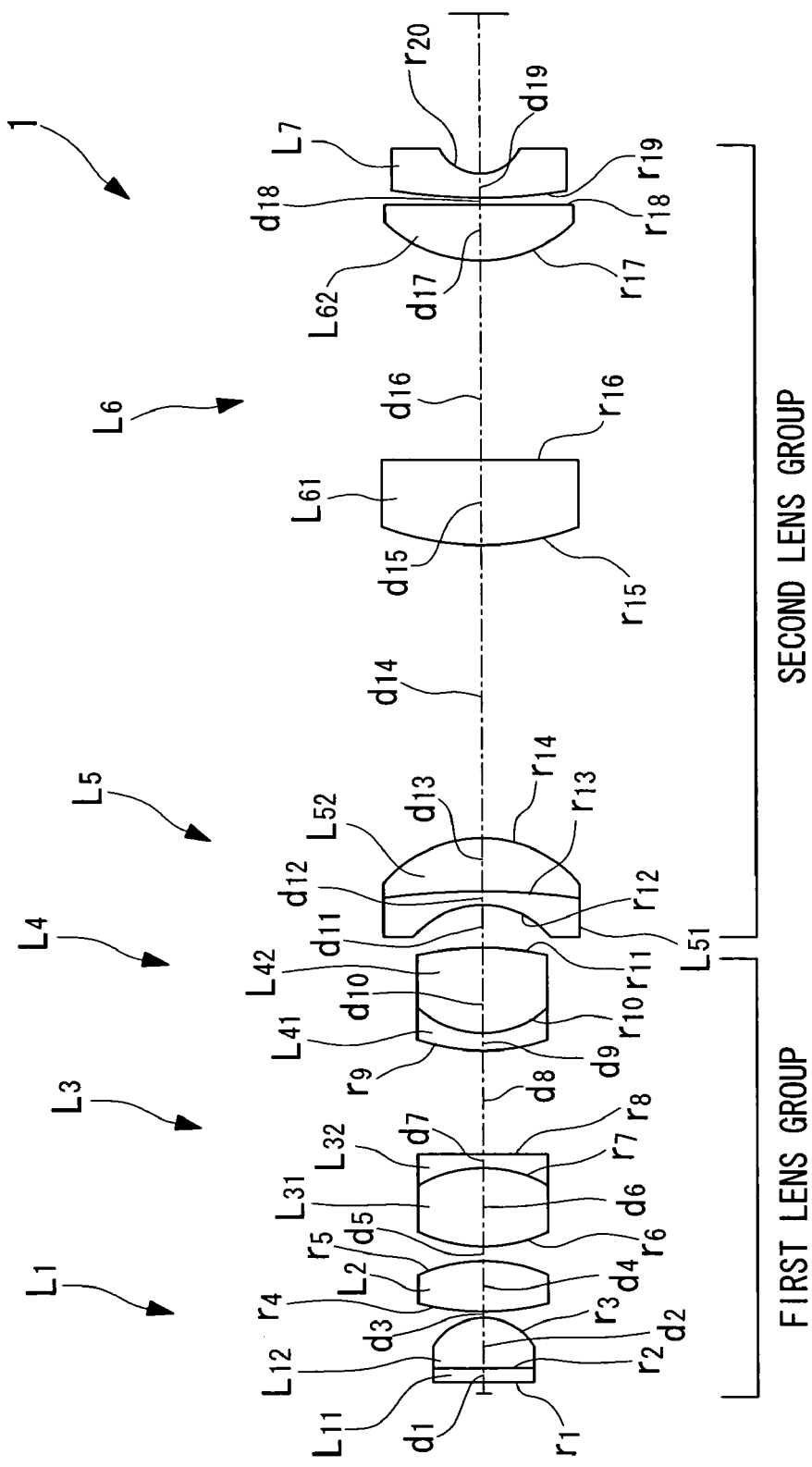
FIG. 3 is a diagram of a lens arrangement of a liquid-immersion objective optical system according to a first example of the present invention.

As shown in FIG. 3, the liquid-immersion objective optical system 1 according to this example includes a first lens group formed of first to fourth lens components L1 to L4 and a second lens group form formed of fifth to seventh lens components L5 to L7. The first lens component L1 is formed of a parallel flat plate L11 and a plano-convex lens L12 having positive refractive power, whose convex surface faces the image-plane side. The second lens component L2 is formed of a biconvex lens with positive refractive power, having one convex surface facing the image-plane side and one convex surface facing the object side.

The third lens component L3 is a compound lens with positive refractive power as a whole, which is formed by cementing to each other a biconvex lens L31 and a negative lens L32. The fourth lens component L4 is a compound lens formed by cementing to each other a negative lens L41 and a biconvex lens L42. The fifth lens component L5 is a compound lens formed by cementing to each other a negative meniscus lens L51 having a concave surface facing the object side and a positive meniscus lens L52 having a convex surface facing the image-plane side. The sixth lens component L6 is formed of a plano-convex lens L61 and a plano-convex lens L62, which have positive refractive powers. The seventh lens component L7 is formed of a negative meniscus lens having negative refractive power.

Table 1 shows the specification data of the liquid-immersion objective optical system according to this example. This specification data corresponds to the lens arrangement shown in FIG. 3. Reference character r represents the radius of curvature, reference character d represents the distance between surfaces, reference character n represents the d-line refractive index, and reference character ν represents the d-line Abbe number.

TABLE 1

| PLANE NUMBER | r | d | n | ν |
|---|---|---|---|---|
| OBJECT PLANE | ∞ | 0.2 | WATER | |
| 1 | ∞ | 0.3 | 1.51633 | 64.14 |
| 2 | ∞ | 1.1 | 1.43875 | 94.93 |
| 3 | −1.108 | 0.08 | | |
| 4 | 5.741 | 1 | 1.43875 | 94.93 |
| 5 | −2.32 | 0.18 | | |
| 6 | 2.32 | 1.62 | 1.43875 | 94.93 |
| 7 | −2.32 | 0.32 | 1.7725 | 49.6 |
| 8 | 77.074 | 2 | | |
| 9 | 3.937 | 0.3 | 1.7725 | 49.6 |
| 10 | 1.667 | 1.76 | 1.43875 | 94.93 |
| 11 | −4.995 | 0.89 | | |
| 12 | −1.686 | 0.3 | 1.6134 | 44.27 |
| 13 | −9.44 | 1.1 | 1.6779 | 55.34 |
| 14 | −2.439 | 5.89 | | |
| 15 | 5.434 | 1.83 | 1.43875 | 94.93 |
| 16 | ∞ | 3.98 | | |
| 17 | 2.744 | 1.1 | 1.741 | 52.64 |
| 18 | ∞ | 0.1 | | |
| 19 | 5.469 | 0.55 | 1.6134 | 44.27 |
| 20 | 0.874 | | | |

The object-side numerical aperture NA, the magnification M, the focal length of the first lens group F1, the distance from the object plane to the image plane LT, the length of the first lens group LG, and the working distance WD for this example, having the specification data shown above, are given in Table 2 (in the "Example 1" column at the upper part of Table 2). Table 2 also shows values for the conditional expressions (1) to (8) described above (in the "Example 1" column at the lower part of Table 2).

Accordingly, the liquid-immersion objective optical system according to the present invention satisfies conditional expressions (1) to (8) described above.

TABLE 2

| | REFERENCE CHARACTER | EXAMPLE 1 | EXAMPLE 2 |
|---|---|---|---|
| NA | OBJECT-SIDE NUMERICAL APERTURE | 0.70 | 0.716 |
| M | MAGNIFICATION | −5.57 | −6.01 |
| F1 | FOCAL LENGTH OF THE FIRST LENS GROUP | 1.986 mm | 2.007 mm |
| LT | DISTANCE FROM THE OBJECT PLANE TO THE IMAGE PLANE | 27.882 mm | 33.157 mm |
| LG1 | LENGTH OF THE FIRST LENS GROUP | 8.66 mm | 8.48 mm |
| WD | WORKING DISTANCE (IN WATER) | 0.2 mm | 0.05 mm |

| | CONDITIONAL EXPRESSIONS | EXAMPLE 1 | EXAMPLE 2 |
|---|---|---|---|
| (1) | \| M · F1/LT \| | 0.397 | 0.364 |
| (2) | \| LG1/LT \| | 0.311 | 0.256 |
| (3) | ν42 − ν41 | 45.33 | 45.33 |
| (4) | n41 − n42 | 0.334 | 0.334 |
| (5) | \| R4/F1 \| | 0.839 | 0.832 |
| (6) | ν31 − ν32 | 45.330 | 45.330 |
| (7) | \| R3/F1 \| | 1.168 | 1.156 |
| (8) | \| R5O/R5I \| | 0.691 | 0.691 |

As shown in Table 2, with this example, since the overall length of the optical system from the object plane of the liquid-immersion objective optical system 1 to the image plane is 27.882 mm, it is difficult for the pupil-projection optical system 12 and the scanning unit 11 to touch the specimen A, even though the pupil-projection optical system 12 and the scanning unit 11 are connected behind the liquid-immersion objective optical system 1.

The length of the first lens group is 8.66 mm and the lens diameter of the first lens group is 2.5 mm or less. Therefore, it is suitable for carrying out in-vivo examination deep inside a small laboratory animal, such as a mouse, with minimal invasiveness.

Also, as shown in Table 2, since the numerical aperture is as high as 0.7 and on-axis chromatic aberration and chromatic difference of magnification are well-corrected, it is suitable for white-light observation and fluoroscopy, and in particular, for use as a liquid-immersion objective optical system 1 of a laser-scanning confocal optical microscope 2.

Since the working distance (WD) is 0.2 mm, it is possible to examine the interior of the specimen A without blur by pressing the tip of the liquid-immersion objective optical system 1 against the specimen A.

FIGS. 4A to 4D and 5A to 5B show aberration diagrams for the liquid-immersion objective optical system 1 according to this Example.

Figure 4A:
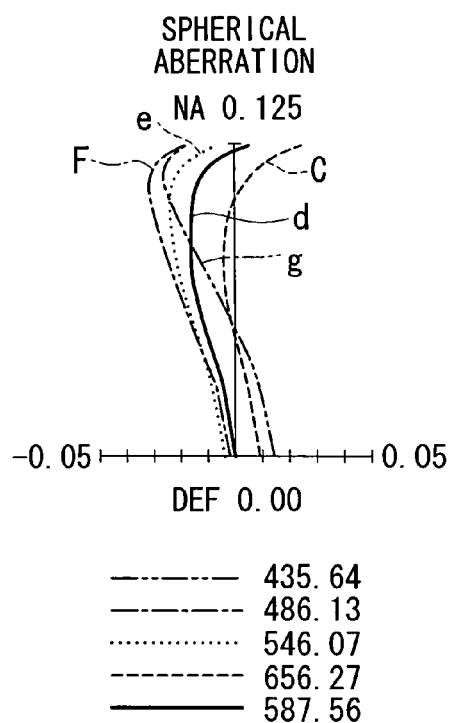
FIG. 4A is an aberration diagram showing spherical aberration for the lens arrangement in FIG. 3.
Figure 4B:
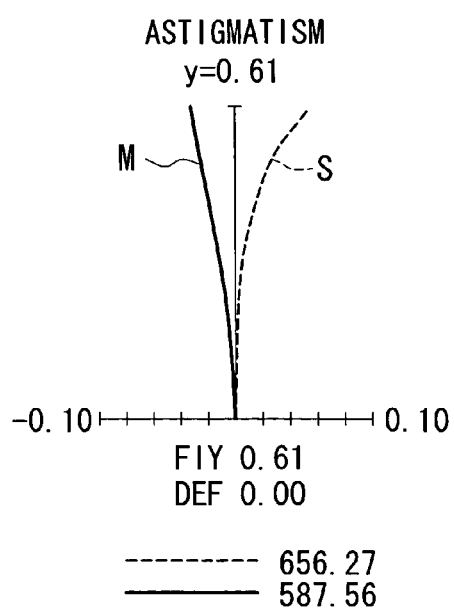
FIG. 4B is an aberration diagram showing astigmatism for the lens arrangement in FIG. 3.
Figure 4C:
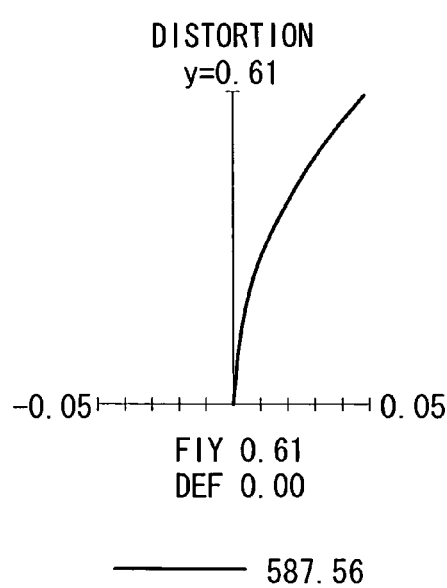
FIG. 4C is an aberration diagram showing distortion for the lens arrangement in FIG. 3.
Figure 4D:
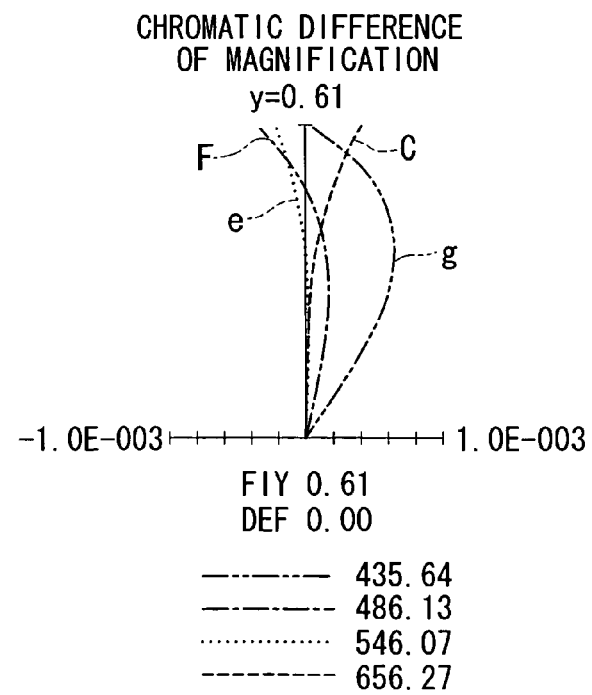
FIG. 4D is an aberration diagram showing chromatic difference of magnification for the lens arrangement in FIG. 3.
Figure 5B:
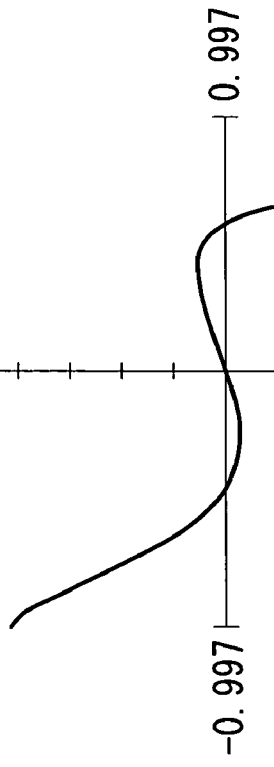
FIG. 5B is an aberration diagram showing saggital-plane comatic aberration for the lens arrangement in FIG. 3.
Figure 5A:
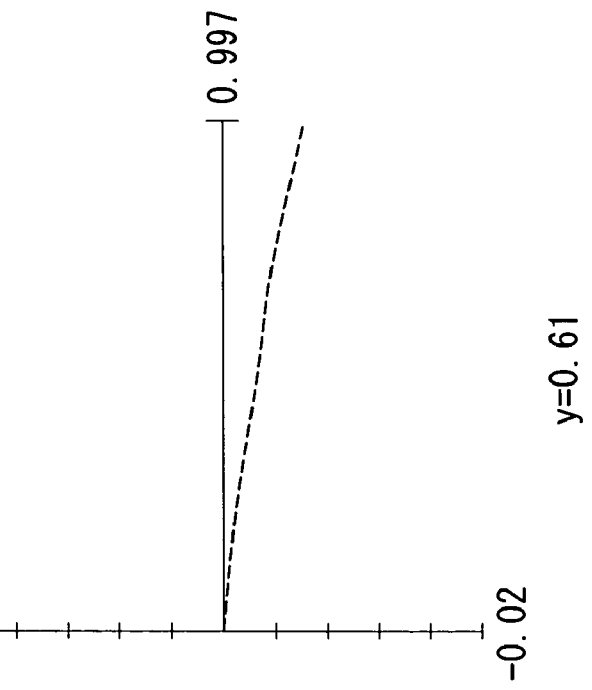
FIG. 5A is an aberration diagram showing meridional-plane comatic aberration for the lens arrangement in FIG. 3.

FIG. 4A shows spherical aberration, FIG. 4B shows astigmatism, FIG. 4C shows distortion, and FIG. 4D shows chromatic difference of magnification. Also, FIG. 5A shows comatic aberration in the meridional plane, and FIG. 5B shows comatic aberration in the saggital plane. Reference characters NA in the figure represent the image-side numerical aperture, y represents the image height, M represents the aberration in meridional plane, and S represents aberration in the saggital plane. The chromatic difference of magnification shown is with reference to the d-line (587.56 nm). For the spherical aberration and the chromatic difference of magnification curves, the C-line is 656.27 nm, the d-line is 587.56 nm, the e-line is 546.07 nm, the F-line is 486.13 nm, and the g-line is 435.84 nm.

Example 2

Next, a second example of the liquid-immersion objective optical system 1 according to the above-described embodiment is described with reference to FIGS. 6 to 8B.

Figure 6:
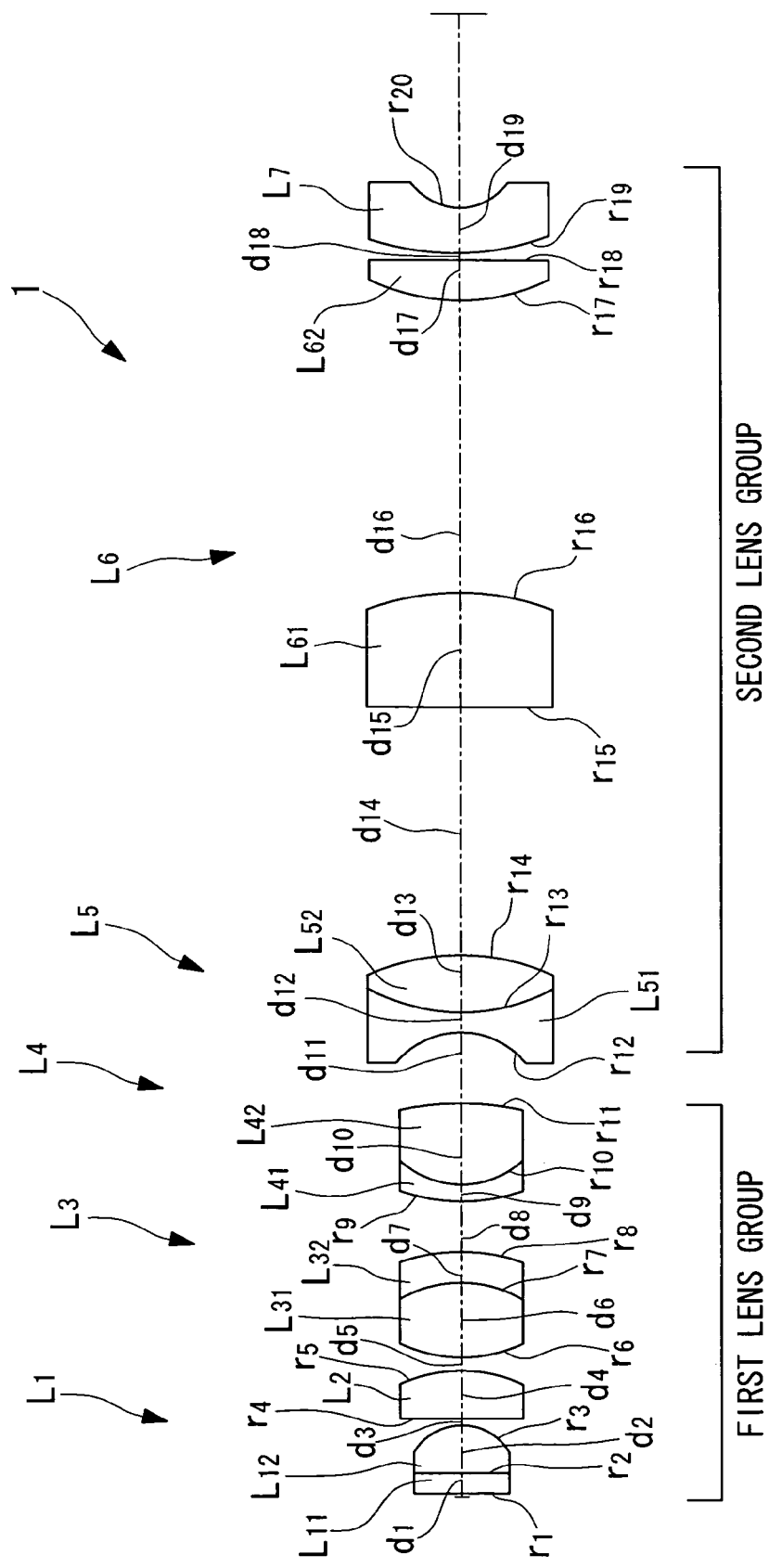
FIG. 6 is a diagram showing the lens arrangement of a liquid-immersion objective optical system according to a second example of the present invention.

As shown in FIG. 6, the liquid-immersion objective optical system 1 according to this Example includes a first lens group formed of first to fourth lens components L1 to L4 and a second lens group formed of fifth to seventh lens components L5 to L7. The first lens component is formed of a parallel flat plate L11 and a plano-convex lens L12 with positive refractive power, whose flat surface faces the object side and whose convex surface faces the image-plane side. The second lens component L2 is formed of a plano-convex lens with positive refractive power, whose convex surface faces the image-plane side.

The third lens component L3 is a compound lens with positive refractive power overall, formed by cementing together a biconvex lens L31 and a negative meniscus lens L32. The fourth lens component L4 is a compound lens formed by cementing together a negative meniscus lens L41 and a biconvex lens L42. The fifth lens component L5 is a compound lens formed by cementing together a biconcave lens L51 and a biconvex lens L52. The sixth lens component L6 is formed of a plano-convex lens L61 and a plano-convex lens L62, which have positive refractive powers. The seventh lens component L7 is formed of a negative meniscus lens having negative refractive power.

Table 3 shows the specification data for the liquid-immersion objective optical system 1 of this Example. This specification data corresponds to the lens arrangement shown in FIG. 6'.

TABLE 3

| PLANE NUMBER | r | d | n | ν |
|---|---|---|---|---|
| OBJECT PLANE | ∞ | 0.05 | WATER | |
| 1 | ∞ | 0.47 | 1.51633 | 64.14 |
| 2 | ∞ | 1.1 | 1.7725 | 49.6 |
| 3 | −1.4029 | 0.1 | | |
| 4 | ∞ | 1 | 1.7725 | 49.6 |
| 5 | −5.405 | 0.54 | | |
| 6 | 2.32 | 1.63 | 1.43875 | 94.93 |
| 7 | −2.32 | 0.5 | 1.7725 | 49.6 |
| 8 | −8.0251 | 1.13 | | |
| 9 | 5.3675 | 0.51 | 1.7725 | 49.6 |
| 10 | 1.6703 | 1.5 | 1.43875 | 94.93 |
| 11 | −3.499 | 1.68 | | |
| 12 | −2.078 | 0.51 | 1.6134 | 44.27 |
| 13 | 3.3531 | 1.4 | 1.6779 | 55.34 |
| 14 | −3.5 | 5.5329 | | |
| 15 | ∞ | 2.5 | 1.43875 | 94.93 |
| 16 | −9.0136 | 6.6323 | | |
| 17 | 4.2208 | 0.9 | 1.7725 | 49.6 |
| 18 | ∞ | 0.1 | | |
| 19 | 5 | 1 | 1.51633 | 64.14 |
| 20 | 1.3754* | | | |

The object-side numerical aperture NA, the magnification M, the focal length of the first lens group F1, the distance from the object plane to the image plane LT, the length of the first lens group LG, and the working distance WD for this example, having the specification data shown above, are given in Table 2 (in the "Example 2" column at the upper part of Table 2). Table 2 also shows values for the conditional expressions (1) to (8) described above (in the "Example 2" column at the lower part of Table 2).

Accordingly, the liquid-immersion objective optical system according to the present invention satisfies conditional expressions (1) to (8) described above.

The liquid-immersion objective optical system 1 in this Example has a length even longer compared to that in Example 1 and is corrected for chromatic aberrations from the visible light region to the near-infrared region around 900 nm. As shown in Table 2, the length of the first lens group is 8.48 mm and the lens diameter of the first lens group is 2.5 mm or less, and therefore, it is suitable for carrying out in-vivo examination deep inside a small laboratory animal, such as a mouse, with minimal invasiveness.

Also, since the numerical aperture is as high as 0.72 and on-axis chromatic aberration and chromatic difference of magnification are well-corrected, it is suitable for white-light observation and fluoroscopy, and in particular, for use as a liquid-immersion objective optical system 1 of a laser-scanning confocal optical microscope 2.

Since the overall length of the optical system from the object plane of the liquid-immersion objective optical system 1 to the image plane is 33.157 mm, it is difficult for the pupil-projection optical system 12 and the scanning unit 11 to touch the specimen A, even though the pupil-projection optical system 12 and the scanning unit 11 are connected behind the liquid-immersion objective optical system 1.

Since the working distance (WD) is 0.05 mm, it is possible to examine the vicinity of the surface of the specimen A without blur by pressing the tip of the liquid-immersion objective optical system against the specimen A.

FIGS. 7A to 7D and FIGS. 8A and 8B show aberration diagrams for the liquid-immersion objective optical system 1 according to this Example.

Figure 7A:
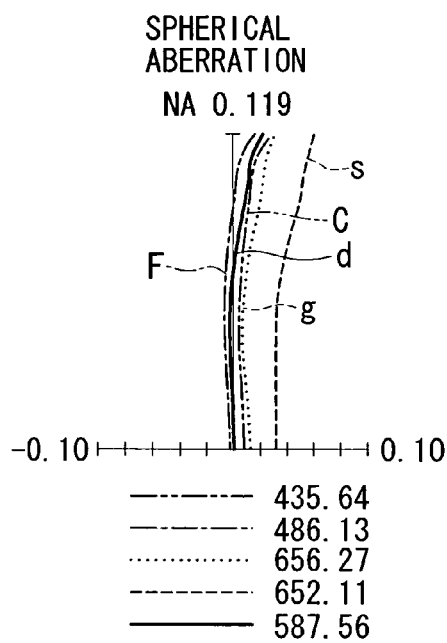
FIG. 7A shows an aberration diagram for the lens arrangement in FIG. 6.
Figure 7B:
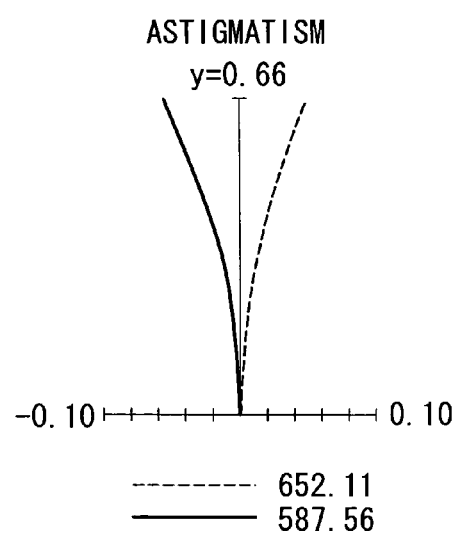
FIG. 7B shows an aberration diagram for the lens arrangement in FIG. 6.
Figure 7C:
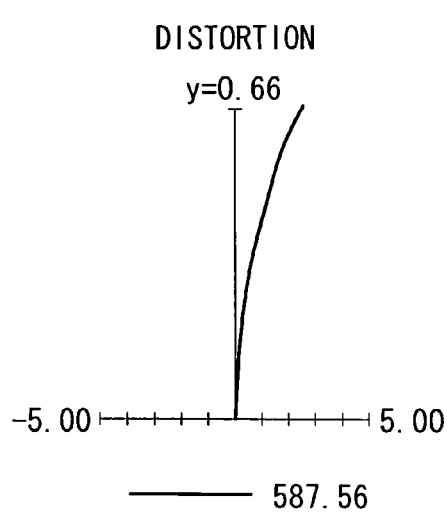
FIG. 7C shows an aberration diagram for the lens arrangement in FIG. 6.
Figure 7D:
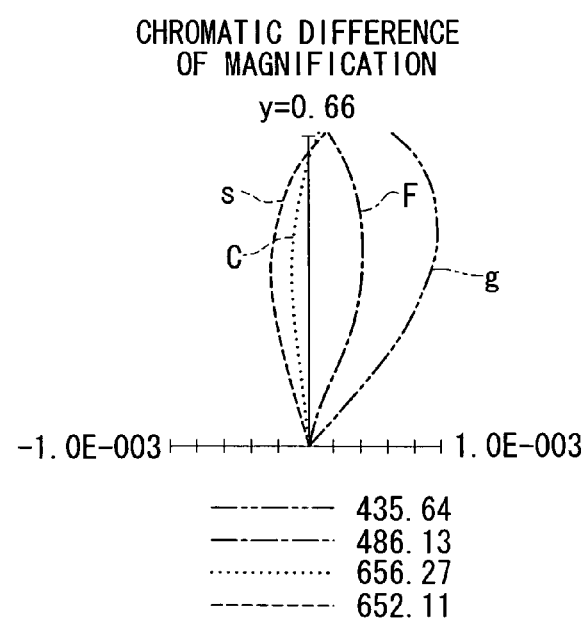
FIG. 7D shows an aberration diagram for the lens arrangement in FIG. 6.
Figure 8A:
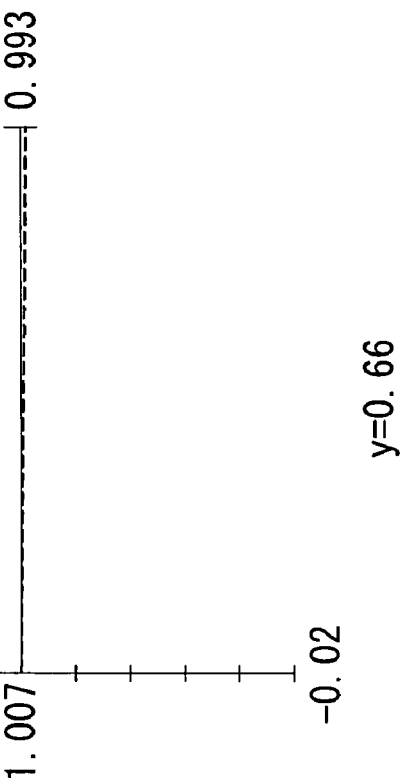
FIG. 8A is an aberration diagram showing meridional-plane comatic aberration for the lens arrangement in FIG. 6.
Figure 8B:
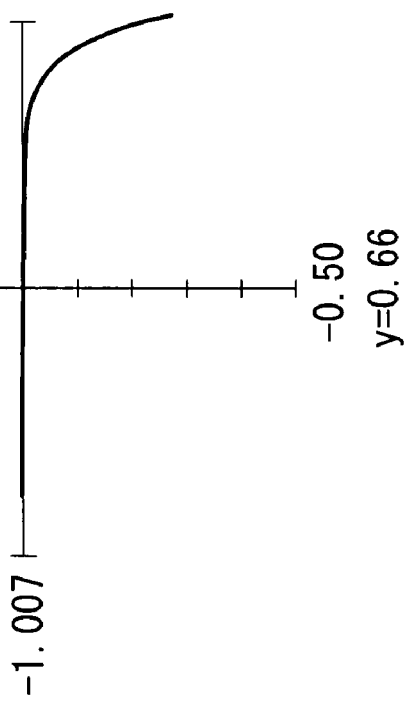
FIG. 8B is an aberration diagram showing saggital-plane comatic aberration for the lens arrangement in FIG. 6.

FIG. 7A shows spherical aberration, FIG. 7B shows astigmatism, FIG. 7C shows distortion, and FIG. 7D shows chromatic difference of magnification. Also, FIG. 8A shows comatic aberration in the meridional plane, and FIG. 8B shows comatic aberration in the saggital plane. The reference characters in the figure represent the same as those in FIGS. 4A to 4D and FIGS. 5A and 5B. For the spherical aberration and the chromatic difference of magnification curves, the s-line is 852.11 nm, the C-line is 656.27 nm, the d-line is 587.56 nm, the e-line is 546.07 nm, the F-line is 486.13 nm, and the g-line is 435.84 nm.

In the liquid-immersion objective optical system 1 according to Example 1 and Example 2, an image fiber bundle and a CCD can be connected to enable bright-field observation to be carried out.

In such a case, various methods are possible; for example, an illumination fiber may be provided on the immediate outer side of the liquid-immersion objective optical system 1 to illuminate the specimen, and a relay lens and half-mirror may be provided at the rear side of the liquid-immersion objective optical system 1 to make the illumination light incident along the same axis as the liquid-immersion objective optical system 1.

What is claimed is:

1. A liquid-immersion objective optical system comprising:
    a first lens group; and
    a second lens group,
    the first lens group including
        a first lens component having positive refractive power, wherein an object side thereof is a flat surface and a convex surface thereof faces an image-plane side;
        a second lens component having positive refractive power, wherein a convex surface thereof faces the image-plane side;
        a third lens component having positive refractive power as a whole, formed by cementing a biconvex positive lens and a negative lens; and
        a fourth lens component formed by cementing a negative lens and a biconvex positive lens;
    the second lens group including
        a fifth lens component formed by cementing at least a lens having a concave surface facing the object side and a lens having a convex surface facing the image-plane side;
        a sixth lens component having positive refractive power; and
        a seventh lens component having negative refractive power,
    wherein the liquid-immersion objective optical system satisfies conditional expressions (1) and (2)

$$0.2 < |M \cdot F1/LT| < 0.45 \quad (1)$$

$$0.2 < |LG1/LT| < 0.4 \quad (2)$$

wherein F1 is the overall focal length of the first lens group, M is the magnification of the liquid-immersion objective optical system, LT is the distance from an object plane to the image plane, and LG1 is the distance from the object side of the first lens component to the image side of the fourth lens component.

2. A liquid-immersion objective optical system according to claim 1, wherein the following conditional expressions (3), (4) and (5) are satisfied $$\nu 42 - \nu 41 > 40 \quad (3)$$

$$n41 - n42 > 0.3 \quad (4)$$

$$0.7 < |R4/F1| < 1.2 \quad (5)$$

wherein R4 is the radius of curvature of a cemented surface in the fourth lens component, ν41 and ν42 are the d-line Abbe numbers of the negative lens and the biconvex positive lens in the fourth lens component, respectively, and n41 and n42 are the d-line refractive indices of the negative lens and the biconvex positive lens in the fourth lens component, respectively.

3. A liquid-immersion objective optical system according to claim 1, wherein the following conditional expressions (6) and (7) are satisfied $$\nu 31 - \nu 32 \geq 40 \quad (6)$$

$$0.7 < |R3/F1| < 1.7 \quad (7)$$

wherein R3 is the radius of curvature of the cemented surface of the third lens component, and ν31 and ν32 are the d-line Abbe numbers of the biconvex positive lens and the negative lens, respectively, in the third lens component.

4. A liquid-immersion objective optical system according to claim 1, wherein the following conditional expression (8) is satisfied $$0.5 < |R5O/R5I| < 0.8 \quad (8)$$

wherein R5O is the radius of curvature of the concave surface at the object side of the fifth lens component, and R5I is the radius of curvature of the convex surface at the image-plane side of the fifth lens component.

5. A liquid-immersion objective optical system according to claim 1, wherein the first lens component is formed by cementing a parallel flat plate and a plano-convex lens.

6. A liquid-immersion objective optical system according to claim 1, wherein the sixth lens component includes two lenses having positive refractive power.

* * * * *